Dec. 9, 1930.   H. G. REIST   1,784,643

METHOD OF MAKING STATORS FOR DYNAMO ELECTRIC MACHINES

Original Filed March 14, 1928

Inventor
Henry G. Reist,
by Charles E. Tullar
His Attorney.

Patented Dec. 9, 1930

1,784,643

UNITED STATES PATENT OFFICE

HENRY G. REIST, OF SCHENECTADY, NEW YORK, ASSIGNOR TO GENERAL ELECTRIC COMPANY, A CORPORATION OF NEW YORK

METHOD OF MAKING STATORS FOR DYNAMO-ELECTRIC MACHINES

Application filed March 14, 1928, Serial No. 261,629. Renewed May 3, 1930.

My invention relates generally to dynamo-electric machines, and more particularly to a method of making stators therefor.

Heretofore, the laminations have usually been supported in the stator frame of a dynamo-electric machine of large size by dovetailed grooves or projections formed on supporting ribs attached to the frame. The laminations have fitted these grooves or projections with a clearance of about fifteen-thousandths of an inch, and the tolerance permissible in locating the rib in the frame is about half of this clearance. In instances in which these ribs have been welded they have been placed in position in the frame and welded thereto in a single operation. As a result, the expansion of the rib and adjacent part of the frame due to the heating incident to welding has made it difficult, if not impossible, to weld the ribs in the frame in such relation to each other that the laminations could be stacked on the dovetails carried by the ribs. In fact it has ordinarily been necessary to accurately align the ribs in the frame after the welding operation by hammering or otherwise forcing them into the desired position with respect to the frame, which is difficult and adds greatly to the cost of the stator.

The object of my invention is to provide a method of welding the lamination supporting ribs to the stator frame of the dynamo-electric machine, which will accurately locate the ribs with respect to the frame and avoid the necessity of altering their location after the completion of the welding operation. I accomplish this by, arranging the ribs in the frame, tack welding gussets to the frame and to the ribs and then welding the gussets to the frame and to the ribs to permanently secure them in place.

My invention will be more fully set forth in the following description referring to the accompanying drawing and the features of novelty which characterize my invention will be pointed out with particularity in the claims annexed to and forming a part of this specification.

Figure 1:
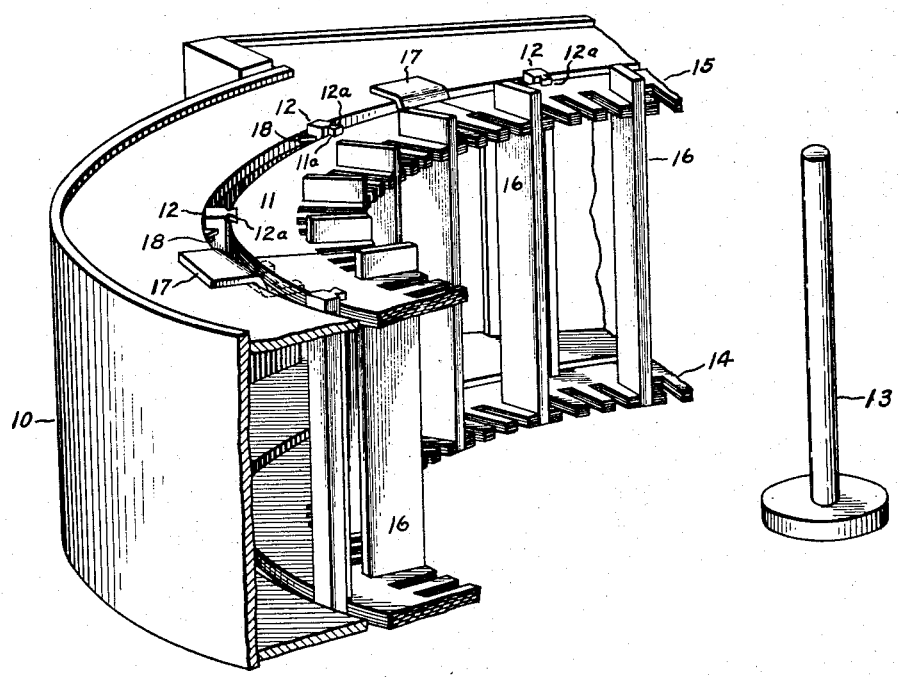
Figure 2:
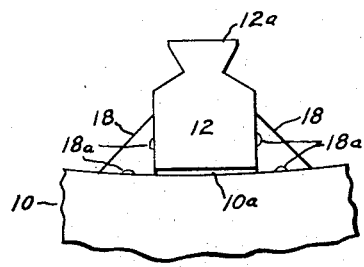
Figure 3:
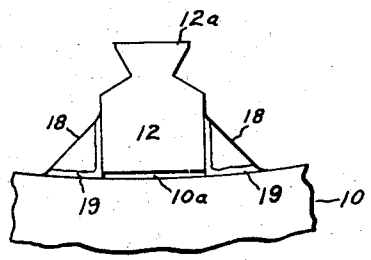

In the drawing, Fig. 1 is a fragmentary perspective view of a stator made in accordance with my improved method; Fig. 2 is an end view of a portion of the stator frame showing the gussets for supporting the lamination supporting ribs tack welded, and Fig. 3 is a view similar to Fig. 2 showing the lamination supporting rib completely welded in place.

As shown in the drawing the stator constructed by my improved method comprises a frame 10 having toothed lamination sectors 11 stacked therein which are supported in the frame by ribs 12 attached thereto and made of rolled stock having dovetails 12a formed thereon adapted to engage dovetailed notches 11a in the laminations. In order to avoid the necessity of machining the frame 10 the ribs 12 are spaced from the frame and arranged in such relation to the axis of the stator that the desired air gap is formed in the completed machine.

In carrying out my improved method the ribs 12 may be arranged in proper relation to the frame and to the axis of the machine in any convenient manner, but I prefer to do this by arranging the frame 10 on the floor of the shop where the machine is being built and approximately centering a shaft 13, which is supported on the floor, in the frame. In order to avoid the necessity of machining the frame, the lamination supporting ribs 12, which I prefer to make of rolled stock having dovetails 12a formed thereon, are then arranged about the inner periphery of the frame 10 in spaced relation thereto, as shown at 10a in Figs. 2 and 3, and in such relation to the shaft 13 that when the laminations are arranged on the dovetails 12a they will form the desired air gap in the completed machine. These lamination supporting ribs may be arranged in this relation to the frame either singly or in groups by the use of suitable templets, but in this particular instance I have placed them in this relation by arranging the ribs about the inner periphery of the frame and stacking bundles of laminations 14 and 15 of a small number of lamination sectors 11 at the ends of the frame. The sectors 11 are formed with dovetailed notches 11a which are adapted to fit on the dovetailed portions 12a of the ribs 12, and the bundles 14 and 15 are stacked with the notches 11a engaging the dovetails 12a and the lamination teeth engaging plates 16 which align the teeth of the laminations with each other. The bundle of laminations 14 is supported on the floor by blocks (not shown), and the bundle of laminations 15 is supported by step shaped plates 17 secured to the end of the frame 10. After the laminations and ribs are arranged in the frame in this manner, they are then centered with respect to the axis of the stator by a suitable pin gage which is placed between the ends of the lamination teeth and the shaft 13 on several radii of the stator, and the laminations and ribs are moved radially away from or toward the shaft 13 until the teeth of the laminations contact with the end of the pin gage. This will result in the ribs 12 being spaced from the frame 10 and they are then attached in this position to the adjacent portions of the frame by gussets 18.

The dovetails 12a slidably fit the notches 11a in the laminations with a clearance of the order of fifteen-thousandths of an inch. The tolerance permissible in locating the ribs in the frame is about half of this clearance because each of the lamination sectors has at least two dovetailed notches engaging adjacent ribs and difficulty is experienced in aligning the lamination teeth if these dovetails more closely fit the notches in the laminations. In order to locate the ribs in the frame with the requisite degree of accuracy in the operation of welding them to the frame, I employ gussets 18 which are welded to the frame and to the ribs. These gussets are first tack welded to the frame at 18a and to the ribs, as shown in Fig. 2, which accurately locates the ribs relative to the frame. To prevent the heating due to the tack welding expanding the parts and displacing the ribs relative to the frame before the tack welds have cooled sufficiently to firmly attach the gussets to the ribs and to the frame, I prefer to cool the tack welds in any convenient manner, as by appling water thereto. The gussets are then welded to the frame and to the ribs as shown at 19 in Fig. 3. Although the heating due to making the complete weld heats the parts and tends to change their position, the tack welds prevents their being permanently displaced so that when the welds cool, the bars will be attached to the frame in such relation thereto that the laminations can be stacked thereon and will form the desired air gap in the completed machine. After the ribs 12 are welded to the frame, the bundles of laminations 14 and 15 are removed from the ribs and the laminations are stacked in the frame in the usual manner, and retained in place by suitable clamping plates.

It will be seen from the foregoing that I have provided an improved method for welding the lamination supporting ribs in a frame of a dynamo-electric machine which accurately locates them with respect to the frame without machine work and avoids the necessity of aligning the ribs after the welding operation.

What I claim as new and desire to secure by Letters Patent of the United States is:

1. The method of attaching a lamination supporting rib to the frame of a dynamo-electric machine, comprising arranging the rib in spaced relation to the frame and in such relation to the axis of the machine that the laminations arranged on the rib will form the desired air gap in the completed machine, tack welding gussets to the frame and to the rib, and then welding the gussets to the frame and to the rib.

2. The method of attaching a lamination supporting rib to the frame of a dynamo-electric machine, comprising arranging the rib in such relation to the axis of the stator that the laminations arranged on the rib will form the desired air gap in the completed machine, tack welding gussets to the frame on opposite sides of the rib and to the rib, and then welding the gussets to the frame and to the rib.

3. The method of attaching a lamination supporting rib to the frame of a dynamo-electric machine, comprising arranging the rib in spaced relation to the frame and in such relation to the axis of the stator that the laminations arranged on the rib will form the desired air gap in the completed machine, tack welding gussets to the frame on opposite sides of the rib and to the rib, and then welding the gussets to the frame and to the rib.

4. The method of attaching a lamination supporting rib to the frame of a dynamo-electric machine, comprising tack welding a gusset to the frame and to the rib, cooling each of the tack welds upon its completion to prevent displacement of the rib relative to the frame, and then welding the gusset to the frame and to the rib.

5. The method of attaching a lamination supporting rib to the frame of a dynamo-electric machine, comprising arranging the rib in spaced relation to the frame and in such relation to the axis of the machine that the laminations arranged on the rib will form the desired air gap in the completed machine, tack welding gussets to the frame and to the rib, cooling each of the tack welds upon its completion to prevent displacement of the rib relative to the frame, and then welding the gussets to the frame and to the rib.

6. The method of attaching a lamination supporting rib to the frame of a dynamo-electric machine, comprising arranging the rib in such relation to the axis of the stator that the laminations arranged on the rib will form the desired air gap in the completed machine, tack welding gussets to the frame on opposite sides of the rib and to the rib, cooling each of the tack welds upon its completion to prevent displacement of the rib relative to the frame, and then welding the gussets to the frame and to the rib.

7. The method of attaching a lamination supporting rib to the frame of a dynamo-electric machine, comprising arranging a rib in spaced relation to the frame and in such relation to the axis of the machine that the laminations arranged on the rib will form the desired air gap in the completed machine, and then welding gussets to the frame and to the rib.

8. The method of attaching a lamination supporting rib to the frame of a dynamo-electric machine, comprising arranging a rib in spaced relation to the frame and in such relation to the axis of the machine that the laminations arranged on the rib will form the desired air gap in the completed machine, arranging gussets adjacent the frame and the rib, and then welding the gussets to the frame and to the rib.

9. The method of attaching a lamination supporting rib to the frame of a dynamo-electric machine, comprising arranging a rib in spaced relation to the frame and in such relation to the axis of the machine that the laminations arranged on the rib will form the desired air gap in the completed machine, securing gussets to the frame and to the rib, and then welding the gussets to the frame and to the rib.

In witness whereof, I have hereunto set my hand this 13th day of March, 1928.

HENRY G. REIST.